United States Patent
Hessler et al.

(10) Patent No.: US 10,715,225 B2
(45) Date of Patent: Jul. 14, 2020

(54) REPORTING OF RADIO CHANNEL QUALITY

(71) Applicant: Telefonaktiebolaget LM Ericsson (publ), Stockholm (SE)

(72) Inventors: Martin Hessler, Linköping (SE); Emil Björnson, Linköping (SE); Erik G. Larsson, Linköping (SE); Reza Moosavi, Linköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/073,950

(22) PCT Filed: Feb. 4, 2016

(86) PCT No.: PCT/EP2016/052377
§ 371 (c)(1),
(2) Date: Jul. 30, 2018

(87) PCT Pub. No.: WO2017/133775
PCT Pub. Date: Aug. 10, 2017

(65) Prior Publication Data
US 2019/0044590 A1    Feb. 7, 2019

(51) Int. Cl.
*H04B 7/0456* (2017.01)
*H04L 1/00* (2006.01)
(Continued)

(52) U.S. Cl.
CPC ......... *H04B 7/0456* (2013.01); *H04B 17/104* (2015.01); *H04B 17/318* (2015.01);
(Continued)

(58) Field of Classification Search
CPC .. H04B 7/0456; H04B 17/104; H04B 17/345; H04B 17/318; H04L 5/0048; H04L 1/0026; H04L 1/0005; H04L 1/0001
(Continued)

(56) References Cited

U.S. PATENT DOCUMENTS

| | | | |
|---|---|---|---|
| 9,647,794 B2* | 5/2017 | Baker | H04L 1/0026 |
| 2015/0181526 A1* | 6/2015 | Lee | H04W 52/0241 370/311 |
| 2017/0195016 A1* | 7/2017 | Alexander | H04B 7/0417 |

FOREIGN PATENT DOCUMENTS

| | | |
|---|---|---|
| EP | 1569492 A2 | 8/2005 |
| EP | 2362563 A1 | 8/2011 |

(Continued)

OTHER PUBLICATIONS

European Office Action issued in corresponding EP Application No. 16703110.3; dated May 31, 2019; 06 pages. All references cited therein have been previously made of record.
(Continued)

*Primary Examiner* — Fitwi Y Hailegiorgis
(74) *Attorney, Agent, or Firm* — Patent Portfolio Builders, PLLC

(57) ABSTRACT

A method implemented in a first radio device (UE) for quality reporting of a radio channel (2) comprising: Determining a condition of the radio channel and entering a monitoring phase if the condition of the radio channel exhibits an invariance of statistics of the radio channel (810, 811), Receiving at least one data symbol via said radio channel during the monitoring phase (812), Determining a statistical characterization of the radio channel based on the received data symbol (813), and Reporting a quality of the radio channel (2) to a second radio device if the statistical characterization exceeds a predetermined threshold (814).

14 Claims, 10 Drawing Sheets

(51) Int. Cl.
  *H04B 17/318* (2015.01)
  *H04B 17/345* (2015.01)
  *H04B 17/10* (2015.01)
  *H04L 5/00* (2006.01)

(52) U.S. Cl.
  CPC ......... *H04B 17/345* (2015.01); *H04L 1/0001* (2013.01); *H04L 1/0026* (2013.01); *H04L 5/0048* (2013.01); *H04L 1/0005* (2013.01)

(58) Field of Classification Search
  USPC .......................................... 375/262; 370/311
  See application file for complete search history.

(56) References Cited

FOREIGN PATENT DOCUMENTS

| | | | |
|---|---|---|---|
| EP | 3016308 A1 | 5/2016 | |
| WO | 2013067345 A1 | 5/2013 | |
| WO | 2014206167 A1 | 12/2014 | |

OTHER PUBLICATIONS

European Office Action issued in corresponding EP Application No. 16703110.3; dated Oct. 22, 2019; 04 pages. All references cited therein have been previously made of record.

\* cited by examiner

REPORTING OF RADIO CHANNEL QUALITY

TECHNICAL FIELD

The present disclosure relates to telecommunications and in particular to a method for quality reporting of a radio channel. The disclosure further relates to a method for adaptation of transmission over a radio channel. A first radio device and a second radio device as well as a system comprising the first and the second radio device are also disclosed herein.

BACKGROUND

Wireless systems transmit communication signals in the downlink over radio frequency channels from a radio device, for example a fixed transceiver such as a base station, to another radio device, for example a user equipment (UE), within a geographic area, or cell. The UE may transmit signals in the uplink to one or more base stations. In both cases, the received signal may be characterized as the transmitted signal, altered by channel effects, plus noise and interference. To recover the transmitted signal from a received signal, a receiver thus requires both an estimate of the channel, and an estimate of the noise/interference. The characterization of a channel is known as channel state information (CSI). One known way to estimate a channel is to periodically transmit known reference symbols, also known as pilot symbols. Since the reference symbols are known by the receiver, any deviation in the received symbols from the reference symbols (once estimated noise/interference is removed) is caused by channel effects. An accurate estimate of CSI allows a receiver to more accurately recover transmitted signals from received signals. In addition, by transmitting CSI from the receiver to a transmitter, the transmitter may select the transmission characteristics—such as coding, modulation, and the like—best suited for the current radio channel condition. This is known as channel-dependent link adaptation.

Multiple-input, multiple-output (MIMO) communications can significantly increase spectral efficiencies of wireless systems. Under idealized conditions, a capacity scales as the minimum of $(n_r, n_t)$ where $n_r$ is the number of receive antennas and $n_t$ is the number of transmit antennas. The possibility of high data rates has spurred work on the capacity achievable by MIMO systems under various assumptions about the channel, the transmitter and the receiver. The spatial channel model and assumptions about the channel state information (CSI) at the transmitter (CSIT) and the receiver (CSIR) have a significant impact on the MIMO capacity.

Various data symbol transmission techniques have been proposed for MIMO systems, e.g. in the context of a single-carrier system with a flat fading radio channel. In the particular circumstance of a flat fading channel, the propagation channel between any one antenna of the transmitter and any one antenna of the receiver may be modeled by means of a complex gain. As a result, the propagation channel between a transmitter having a plurality of transmit antennas and a receiver having a plurality of receive antennas can be written in the form of a complex matrix, referred to as the MIMO propagation channel matrix, in which each row corresponds to a receive antenna and each column corresponds to a transmit antenna.

Among those techniques, some rely on knowledge of the MIMO propagation channel matrix on transmission. This channel knowledge makes it possible to calculate a focusing or "beamforming" matrix Q that is applied to the data symbols before they are transmitted by the transmit antennas. This precoding matrix Q enables each data symbol to be focused on a particular receive antenna in order to facilitate decoding of the received data symbols on reception.

Furthermore a radio device such as a base station BS, when having excessive number of antennas, can simultaneously schedule multiple receivers at the same time/frequency band with simple linear processing such as maximum-ratio transmission (MRT) or zero-forcing (ZF) in the downlink and maximum-ratio combining (MRC) or ZF in the uplink. This is often referred to as very large (VL) multi-user (MU) multiple-input-multiple-output (MIMO) or massive MIMO and is abbreviated by VL-MIMO or Massive-MIMO hereafter.

SUMMARY

Today's wireless systems employ different transmission modes, that is to say, different predefined transmission methods may be employed for transmission. These transmission modes are optimized by exploiting the variations in frequency and interference domain, and hence quality reporting is designed for this purpose. For MIMO systems where the frequency domain variations are averaged away and the effect of interference is smoothened due to radio channel hardening, current reporting, e.g. of CSI and/or CQI, works poorly. Especially in such cases the known quality reporting accounts for overhead only. Furthermore, it is not possible to acquire important knowledge of how well the MIMO pre-equalization and interference nulling works from the current CQI/CSI reporting.

Thus it is an object to take advantage of a propagation channel "hardening" phenomenon, which is characterized by an invariance of statistics of the channel at the receive antennas.

According to a first aspect a method implemented in a first radio device for quality reporting of a radio channel is provided, the method comprising: Determining a condition of the radio channel and entering a monitoring phase if the condition of the radio channel exhibits an invariance of statistics of the radio channel. The method further comprising: Receiving at least one data symbol via said radio channel during the monitoring phase. The method further comprising: Determining a statistical characterization of the radio channel based on the received data symbol. The method further comprising: Reporting a quality of the radio channel to a second radio device if the statistical characterization exceeds a predetermined threshold.

According to a second aspect a method implemented in a second radio device for adaptation of transmission over a radio channel is provided, the method comprising: Determining a condition of the radio channel in which the radio channel exhibits an invariance of statistics. The method further comprising: Transmitting at least one data symbol via said radio channel. The method further comprising: Receiving a quality report of the radio channel based on the transmitted data symbol from a first radio device if a statistical characterization of the radio channel exceeds a predetermined threshold. The method further comprising: Adapting the radio channel based on the received quality report.

According to a third aspect a first radio device for quality reporting of a radio channel is provided, the first radio device operative to: determine a condition of the radio channel and enter a monitoring phase if the condition of the radio channel exhibits an invariance of statistics of the radio channel. The first radio device is further operative to receive at least one data symbol via said radio channel during the monitoring phase. The first radio device is further operative to determine a statistical characterization of the radio channel based on the received data symbol. The first radio device is further operative to report a quality of the radio channel to a second radio device if the statistical characterization exceeds a predetermined threshold.

According to a fourth aspect a second radio device for adaptation of transmission over a radio channel is provided, the second radio device operative to determine a condition of the radio channel in which the radio channel exhibits an invariance of statistics. The second radio device is further operative to transmit at least one data symbol via said radio channel. The second radio device is further operative to receive a quality report of the radio channel based on the transmitted data symbol from a first radio device if a statistical characterization of the radio channel exceeds a predetermined threshold. The second radio device is further operative to adapt the radio channel based on the received quality report.

According to a fifth aspect a system comprising a first radio device according to the third aspect and a second radio device according to the fourth aspect is provided.

According to a sixth aspect a computer program product comprising program code to be executed by a processor of a first radio device is provided. The computer program product configures when executed the first radio device to operate in accordance with the first aspect.

According to a seventh aspect a computer program product comprising program code to be executed by a processor of a second radio device is provided. The computer program product configures, when executed, the second radio device to operate in accordance with the second aspect.

DETAILED DESCRIPTION

In the following, concepts in accordance with exemplary embodiments will be explained in more detail and with reference to the accompanying drawings. The wireless system may be a wireless network comprising one or more radio devices and may for example be based on the LTE (Long Term Evolution) technology specified by 3GPP. However, it is to be understood that other (cellular) radio technologies could be utilized as well, e.g. the UMTS (Universal Mobile Telecommunications System) technology or a 5G (5th Generation) cellular radio technology.

Within the context of this disclosure, the term radio device encompasses a device which is able to communicate with another radio device by transmitting and/or receiving radio signals, e.g. a network node, such as a base station. Thus, the term radio device encompasses, but is not limited to: mobile phone, smart phone, sensor device, meter, vehicle, household appliance, medical appliance, media player, camera, or any type of consumer electronic, for instance, but not limited to, television, radio, lighting arrangement, tablet computer, laptop, or PC. In particular the first radio device may also be a portable, pocket-storable, hand-held, computer-comprised, or vehicle-mounted mobile device, enabled to communicate voice and/or data, via a wireless or wireline connection.

Although in the following reference is made inter alia to a base station any other radio device may be used and thus constitute a second radio device. The second radio device may thus be an access node of a wireless network or more specifically of an access network. Also, instead of a UE any radio device may be used and thus constitute a first radio device.

Figure 1:
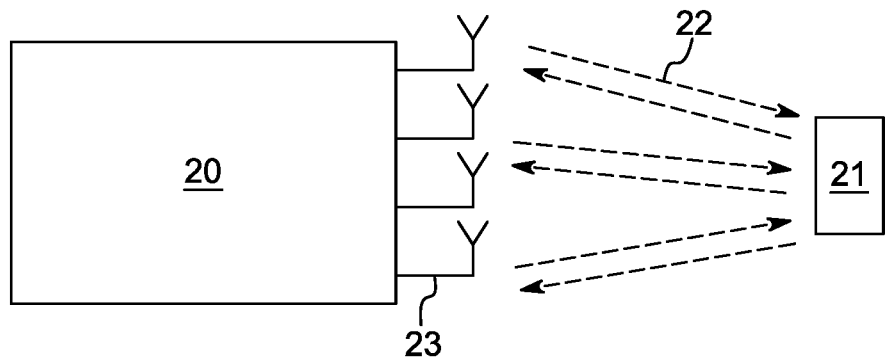
FIG. 1 schematically illustrates a base station operating in SU-MIMO mode.

Now turning to FIG. 1, a multiple-input-multiple-output (MIMO) channel is formed if not only a transmitter but also a receiver has multiple antennas. One application in such a setup is to strive for high peak rates to a single user equipment (UE). By transmitting on several layers which means that the information is transmitted on several bit streams the information is spread in the spatial domain, substantial improvement in data rate can be achieved under favorable channel conditions. This is called single user MIMO (SU-MIMO) since the data on several layers is intended for a single receiver/user/UE/terminal. FIG. 1 shows an example of a base station 20, with multiple transmit antennas 23, that is transmitting in SU-MIMO mode to a single UE 21. As shown in FIG. 1 several layers 22 are transmitted to a single UE 21. In FIG. 1 the UE is also transmitting to the base station 20 using several layers.

Figure 2:
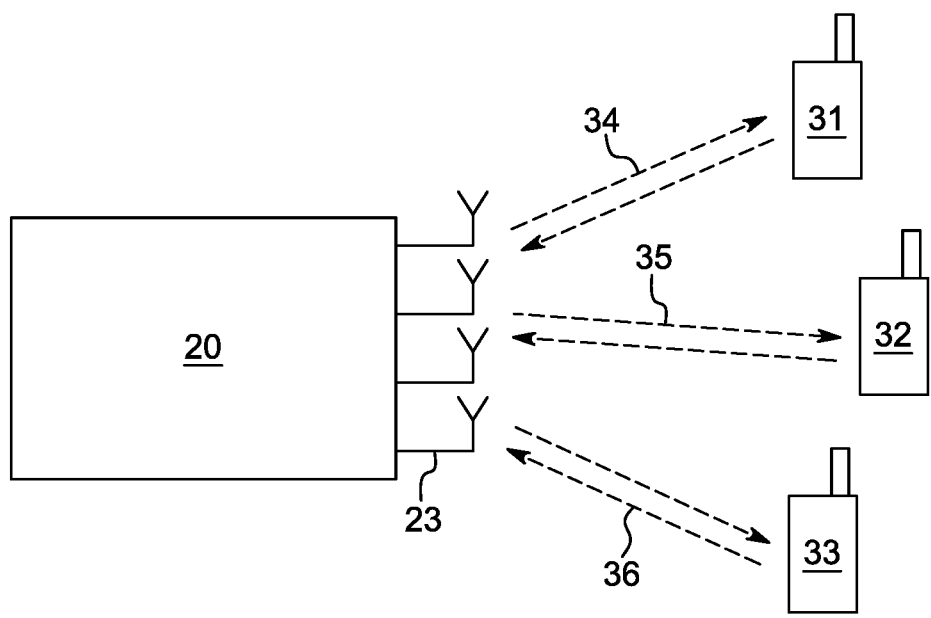
FIG. 2 illustrates a base station operating in MU-MIMO mode.

The number of simultaneously transmitted layers may depend on the properties of the MIMO channel. Because of for example fading, usually the MIMO channel does not support more than one layer transmission to a single UE. This limits the data rate and means that spatial multiplexing gain is not possible. To still reach high system capacity it might be beneficial to transmit only a limited number of layers to a single UE and instead schedule several UEs on the same physical resource (e.g. time—frequency—code tile) and use the spatial domain (layers) to separate the UEs. In essence, layers belonging to different UEs are transmitted on the same physical resource. Even if a radio channel to a particular UE is such that it does not support multiple layers, which means that it is not possible to transmit multiple layers to that particular UE, spatial multiplexing gain on a system level can be achieved as long as the UE can efficiently suppress the layers transmitted to the other UEs. This technique is sometimes referred to as multi-user MIMO (MU-MIMO). As shown in FIG. 2 different layers 34, 35 and 36 are transmitted to each UE 31, 32 and 33. As illustrated in FIG. 2 each UE is also transmitting to the base station 20 using different layers.

Figure 3:
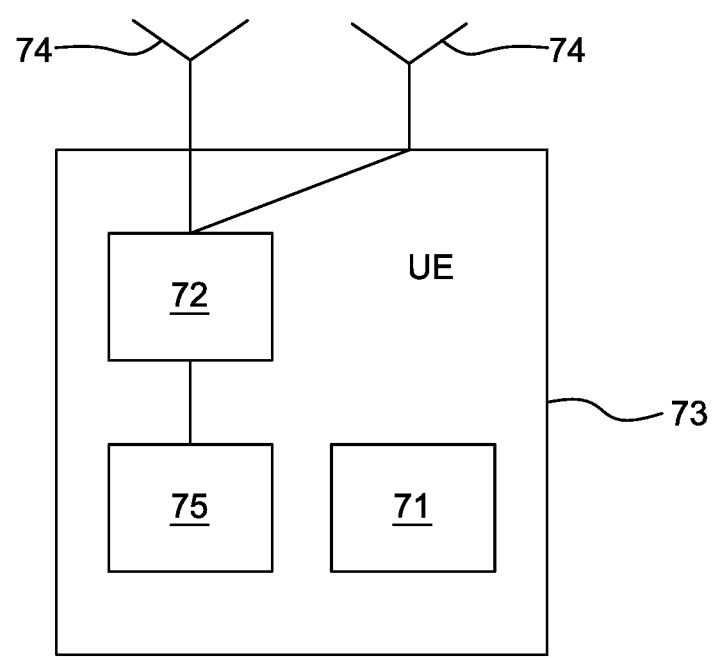
FIG. 3 illustrates a UE with a plurality of receive antennas.

An exemplary UE 73 that has Multiple-Input-Multiple-Output (MIMO) antennas 74 and may support both Single User and/or Multi User Multiple-Input-Multiple-Output (SU-MIMO and MU-MIMO) signaling modes is shown in FIG. 3. The modes may be SDMA (space-division multiple access) for correlated antenna arrays setups, zero-forcing beamforming or other MU-MIMO modes. The UE 73 may further comprise means 71 for switching between the modes. Redundant SU-MIMO mode signaling can for instance relate to transmission rank signaling and/or precoder element signaling. Receiver means 72 is also provided in the UE 73 for receiving from a base station (not shown) information about a (re)interpretation of received data symbols. The receiver means 72 is further configured to receive signaling information associated with MIMO mode. The MIMO signaling information may comprise a power offset between a power reference (e.g. reference symbols (RS)) and the power used to transmit data symbols. Alternatively, the MIMO signaling information may comprise the total number of multiplexed terminals.

Selection of a precoding matrix is involved in a precoding procedure, and a codebook-based precoding matrix selection mechanism is generally used at present especially in case of a MIMO scenario. Thus, for example in MIMO, when performing precoding, a precoding matrix for use in a UE is usually selected at the base station side (for example by a (serving) base station) from a codebook containing a plurality of precoding matrixes and this selected precoding matrix may be indicated to the UE via precoding information such as precoding matrix indicator PCI. The PCI may be transmitted to the UE in downlink (DL) so that the UE may determine a precoding matrix for precoding based on the PCI. The UE may also notify the precoding matrix used by it to the base station through PCI in uplink. Of course, the base station itself may also select a precoding matrix for use in DL radio transmissions. A corresponding PCI may in such a case be signaled to the UE in the DL. Such radio link management may be referred to as radio link adaptation.

Using many antennas at the base station 20 along with an appropriately chosen precoding results in an effective radio channel between the base station and the UE that is independent of the small scale fading and in particular looks flat over frequency. This effect is often referred to as channel hardening. In such a situation the radio channel exhibits an invariance of statistics, which will be explained in more detail in the following:

Considering a multiple-input single-output (MISO) system with M transmit antennas and under the assumption of maximum ratio transmission MRT. Mathematically, the received signal can be expressed by:

$$y = \sqrt{P} h w q + e,$$

where P is the transmitted power, h denotes the M×1 channel vector and $w = h^*/\|h\|$ is the 1×M MRT precoder, q is the unit-energy transmitted symbol and e is zero-mean additive white Gaussian noise with variance $\sigma^2$.

Figure 4:
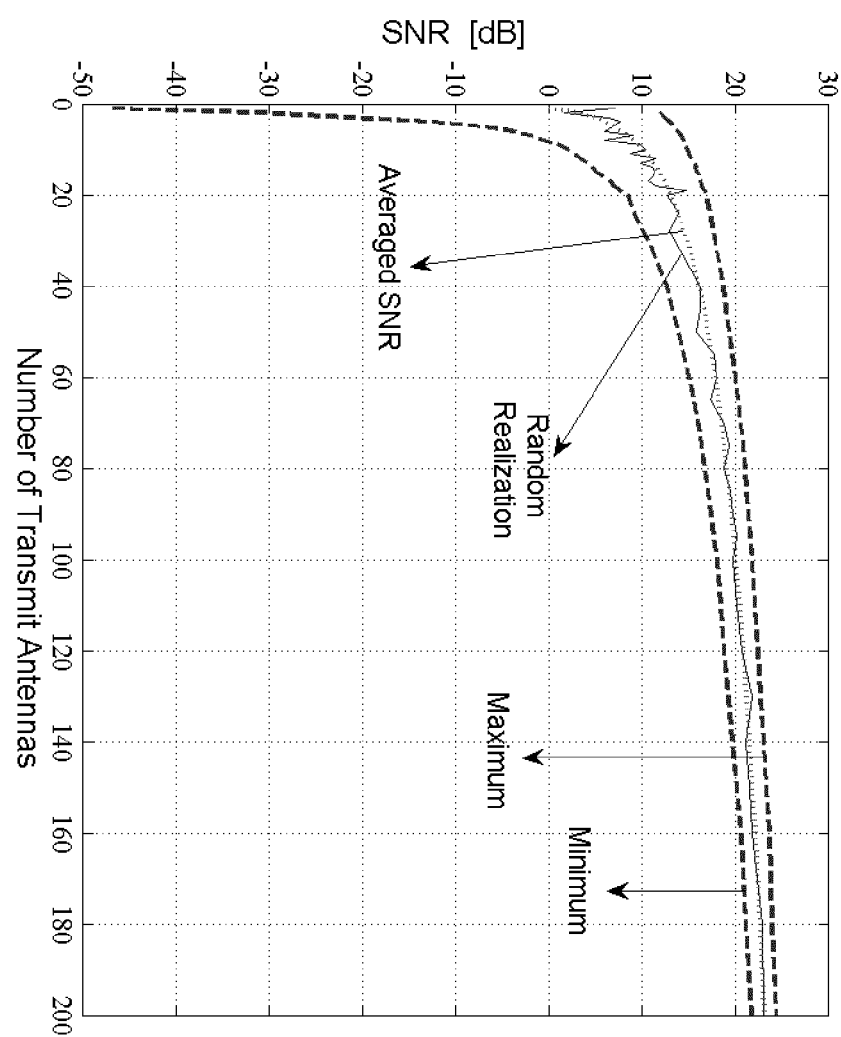
FIG. 4 illustrates a received SNR as a function of the number of transmit antennas for a MISO system.

It can be shown that the averaged received Signal-to-Noise-Ratio SNR scales with M. However, the Signal-to-Noise-Ratio (SNR) variations around the mean depend on the number of antennas M and will decrease as M increases. This can be seen from FIG. 4 where the averaged received SNR as well as the maximum (upper dashed line) and the minimum (lower dashed line) received SNR for 100000 random radio channel realizations are plotted versus the number of antennas. FIG. 4 illustrates the received SNR as a function of number of antennas for a general MISO (Multiple-Input-Single-Output) system.

In FIG. 4, the transmitted SNR is set to 1, i.e. $P/\sigma^2 = 1$ and fast Rayleigh fading where the elements of h are circularly symmetric Gaussian random variables with mean zero and variance 1 is assumed. For illustration, the instantaneous received SNR for a random channel realization is also plotted (solid line).

As can be seen from FIG. 4, the averaged SNR (dotted line) increases linearly as M increases and moreover the SNR variations around the mean decrease with M. Similar observations can be seen with Zero-Forcing (ZF) precoding. This confirms the fact that in systems deploying massive number of antennas, the radio channel after exploiting an appropriate precoder is almost flat and does not vary with time or frequency.

The channel hardening is a desirable phenomenon in practice because it makes the frequency (subcarrier) variations disappear: all subcarriers are equally good so no adaptive per-subcarrier Modulation and/or Coding Scheme (MCS) selection and power allocation are necessary, and furthermore it enables simple demodulators in the downlink that exploits that the effective SNR is equal to its average value without the need for explicit downlink pilots, and more.

Figure 5:
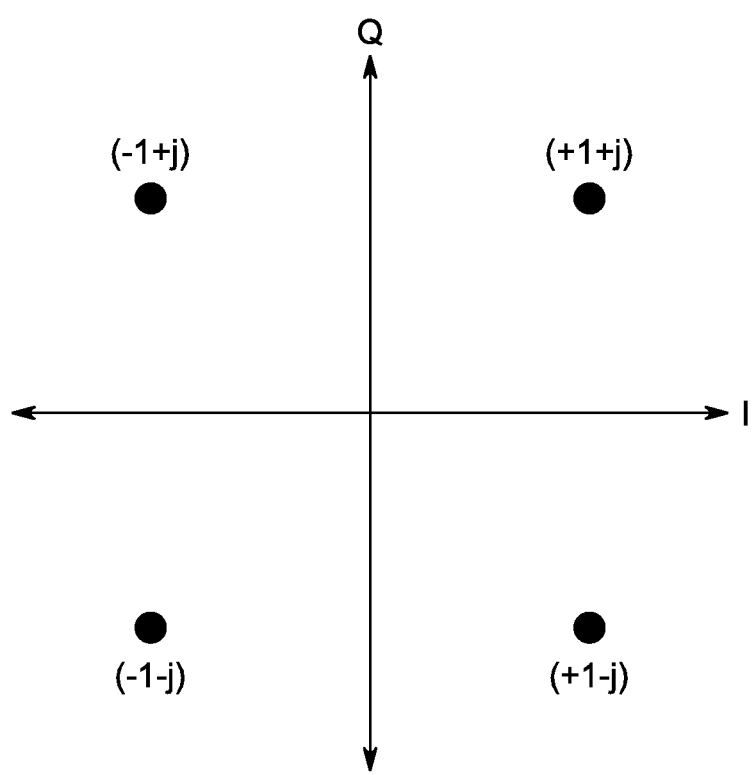
FIG. 5 illustrates constellation points for Quadrature Phase-Shift Keying (QPSK).

In the following an exemplary modulation scheme is described. The constellation points for Quadrature Phase-Shift Keying (QPSK) are shown in FIG. 5. For example, a first Quadrature Phase Shift Keying (QPSK) modulator receives two information bits and modulates these onto a carrier wave in accordance with well-known techniques. That is, the QPSK constellation encodes two bits into one of the four vector values .±.1 .±.j by changing a real part (I or cosine component) between the values +1 and −1 according to a first information bit and an imaginary part (Q or sine component) between the values +j and −j according to a second information bit. However, instead of QPSK data symbols any other data symbols may be used.

However, the signal received and presented to a demodulator will always be accompanied by some (random) noise and channel distortion. The received symbols would in such a case be scattered around the constellation points. Thus, when plotted, the received data symbols would form four clouds around the constellation points as shown in FIG. 5.

Figure 6:
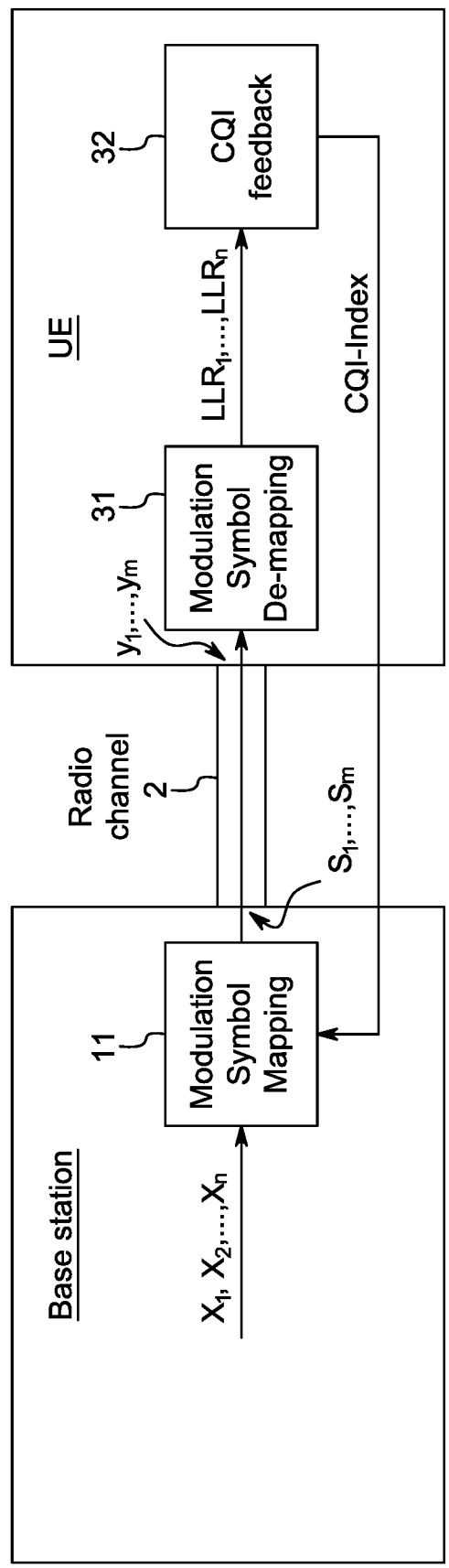
FIG. 6 illustrates reporting of a quality of a radio channel between a base station and UE.

FIG. 6 illustrates the concept of radio channel quality feedback between a base station and an UE, e.g. in a wireless network. Thereto, FIG. 6 shows a base station, a radio channel 2 and an UE. By way of example, a modulation mapping circuit 11 is shown being comprised by the base station, and a modulation de-mapping circuit 31 and a quality feedback circuit 32 are shown being comprised by the UE. By way of example, the modulation mapping circuit 11 receives a sequence of information bits x1, . . . , xn and encodes them to a sequence of modulation symbols or data symbols s1, . . . , sm to be transmitted over the radio channel 2 towards the UE. The modulation de-mapping circuit 31 receives a sequence of received values y1, . . . , ym that correspond to the modulation or data symbols s1, . . . , sm (but that are generally different due to channel characteristics and noise being added to the transmitted signals, cf. FIG. 5 above). It is to be noted that depending on the modulation scheme, a certain number of information bits are mapped into one data symbol, e.g. 2 information bits are mapped into one QPSK symbol, 4 bits are mapped into one 16QAM symbol, and 6 bits are mapped into one 64QAM symbol. A general task of the UE is to decode the encoded information bits x1, . . . , xn.

The channel quality of the radio channel 2 might vary over time, frequency and space. If the radio channel 2 quality is accurately estimated at the UE's side, it can be exploited by the base station to optimize the data transmission. Accordingly, within actual mobile communication systems (e.g. based on LTE), information about the actual radio channel quality is typically obtained by the UE that generates a quality report, such as a so-called Channel-Quality Indicators (CQI), to be fed back at regular intervals to the base station. It is to be noted that the quality report such as CQI may not necessarily explicitly indicate the radio channel quality, but rather a data rate supported by the receiver under the current channel conditions. Accordingly, the quality report should be interpreted broadly as any value based on determined and/or measured radio channel condition to be fed back from the UE to the base station in order to set or adjust the data transmission (e.g. a data rate, a modulation scheme, a transport block size, etc.). Specifically, the CQI might be an information that a certain radio channel condition is met. Such information might be coded into a certain number of bits (e.g. 5 bits) representing one CQI index out of a certain number of predetermined indices. Also, the quality report may comprise an indication, that is a quality indication, indicating a quality of the radio channel.

The symbol de-mapping circuit 31 receives the transmitted symbols y1, . . . , ym. Further, this circuit may receive a modulation information indicating an actual modulation used for the actual transmission, e.g. QPSK, 16QAM, 64QAM, etc. To obtain log-likelihood ratios LLR(k), the modulation symbols y1, . . . , ym are de-mapped to so-called soft bits. By way of example, the de-mapping circuit 31 is so called LogMAP/LogAPP demapper rendering log-likelihood ratios LLR(k) as soft bits at the output.

Thus, instead of reporting any absolute value, as is e.g. done in CSI or CQI reporting according to the prior art, cf. FIG. 6, the UE may determine, for example in a monitoring phase, the performance of a precoding scheme using the precoded data symbol transmissions received without any intermediate UL transmissions. In the case when a precoder, e.g. MRT, is used the reporting may provide how well the precoder currently employed is able to focus energy to the UE and how much the received power declines over time. In the case when a precoder, as e.g. ZF, is used, the reporting may include how well the interference nulling is working, i.e. how much interference energy is received and how much this received energy increases/decreases over time. The reporting of received energy may also be used to determine the pilot contamination of the radio channel or the system in general.

Further on, one or more correlation values for a number of sequentially received downlink (DL) transmissions may be determined, e.g. by the UE measuring DL transmissions. For this purpose, the deviation between the data symbol received and/or between the data symbols received and one or more constellation points may be used. If the deviation value, e.g. a correlation value, exceeds a predetermined threshold a quality report may be triggered and/or transmitted by the UE. Of course, also another statistical characterization of radio channel may be determined and/or used to trigger reporting of the quality of the radio link. For example, if two measurements of the received data symbol have high correlations this means that the two measurements are the same. Thus, in case the correlation falls below the predetermined threshold and/or the deviations (or variations) exceed the predetermined threshold the quality of the radio channel may be reported.

The deviation of one or more data symbols may be determined based on a distribution (assumed for the received data symbols or determined based on a plurality of samples of received data symbols).

Further on, an additional reference symbol (RS) may be configured and/or used by the UE for correlation measurements, e.g. a DL-DMRS. The additional reference symbol may serve as a reference for determining correlation of the data symbols received.

The quality reporting by the UE may be triggered when the deviation, e.g. decline in signal energy/increase in interference energy, exceeds a threshold. The quality reported may be used by the base station to determine that more frequent UL-pilots are needed to mitigate said decline in quality, and/or to schedule said user equipment for a fewer number of transmission-time-intervals (TTI) after said user equipment has sent an uplink pilot. The user equipment may be instructed accordingly by signaling from the base station.

With the proposed solution a system, e.g. a VL-MIMO, can be implemented with less overhead from quality reporting in the uplink (UL). Further the quality reported can be used to optimize the behavior of the wireless system. For example, the most critical aspect of a wireless system, such as a MIMO system, is having sufficiently reliable quality report, e.g. CSI, for which it is critical to have sufficiently frequent UL-reference signals (RS), e.g. sounding reference signals, in order to do reciprocity based downlink transmissions. The deterioration of the radio channel in between said DL-RS is "invisible" to the base station. Hence it is only the UE that is able to detect the (de-)correlation over the downlink data transmissions. Thus the present solution provides an efficient operation, e.g. of a VL-MIMO system.

The downlink (DL) transmission (from the base station to the UE) may include a reference signal such as a DL demodulation reference signal (DL-DMRS). The received signal power may thus be determined from the used reference symbols of the data transmission. However, instead of or additionally to the received signal power a time and/or phase reference may be included in the data transmission.

Rather than using a separate time/frequency reference symbol, the reference for determining a statistical characterization of the radio channel may be jointly coded with the data symbols transmitted, and therefore the received power is estimated from the transmission of data symbols.

The received power (of the data symbol) can be determined in absolute terms or in relation to an expected received power from the base station. The expected received power can, for example, be estimated using knowledge about the path-gain or base station power control, or of the received power of previously received data symbols.

A time variation of the data symbol may be quantified as a relation to a previously received data symbol or as the time difference to the expected received power. The relation to the first received data symbol can, for example, consist of phase rotations of constellation points in the Modulation and/or Coding Scheme (MCS). The expected variations in received power can, for example, be based upon the used MCS on the different data blocks. That is, an MCS may indicate an expected SNR/SINR (Signal-to-Interference-and-Noise-Ratio), hence a decreasing MCS for data transmission can be used to estimate a decrease in SNR/SINR and hence a decrease in received signal power (and/or an increase in interference power).

A reference symbol may be employed having a more detailed reference signal structure which implies that not only received signal power can be estimated but also the frequency variations within the data transmission, e.g. comprising a plurality of data symbols. In this case the frequency variations can be used to determine the success of the precoder selected, that is, for many antennas and a precoder selection the channel should be more or less frequency flat with a "predetermined" or expected received signal power. This implies that for a certain number of antennas and radio channel the amount of frequency variations can be determined by the UE and if the variations exceed a predetermined threshold or if the received signal power deviates from the "predetermined" value this implies a bad precoder selection and that another precoder may be selected by the base station.

Statistical variations of the radio channel may also be evaluated using an autocorrelation calculation between sequential receptions of known reference symbols in time and in some embodiments also frequency. In some cases, this may include the DL-DMRS for data symbols, of a first UE. Instead or additionally a second reference symbol configured for a second UE, e.g. a DL-DMRS of the second UE may be, used.

In another embodiment, the channel variations are computed without explicit use of a (dedicated) reference signal. This is feasible since in an MIMO system, using an appropriately chosen precoder the channel towards the UE is pre-equalized, i.e., the channel looks flat over frequency (channel hardening). Hence, given that the modulation and/or coding format is known, the UE can estimate the signal constellation by demodulation of the DL transmission. Then, the channel variations can be measured by simply comparing the placements of the demodulated DL transmission signal points to the signal constellation of the first DL transmission.

A deviation or variation of the received and/or decoded data symbol from the expected constellation point, such as signal power, signal phase etc., can be considered when determining a statistical characterization of the radio channel.

For interference estimation a corresponding procedure as described in the above for signal estimation may be employed. The interference estimation can be done, e.g. in the case of dual- or multi-layer transmission, by considering a reference symbol of a first layer to the reference symbol of a second layer. The most efficient method to estimate the interference is by subtracting the desired signal from the total radio signal received. In some embodiments more detailed knowledge of the interference may be needed, for example by estimating the interference on some other reference signal belonging to some other user equipment, for example, a second user equipment scheduled jointly with the first user equipment, for example using the ZF-precoding to null the interference from second user equipment towards first user equipment.

The proposed solution can be used to optimize a MIMO system. It is to be understood that a MIMO system may employ different configurations such as Single Input Single Output (SISO), Single Input Multiple output (SIMO), Multiple Input Single Output (MISO) and Multiple Input multiple Output (MIMO).

Advantages with regard to scheduling and performance of the radio may be obtained by using the information gathered in a quality report of the radio channel. As mentioned the reporting can be used to determine how much the performance declines over time. A first benefit of the reporting is that a scheduler of the base station can make a better MCS selection for the radio channel. The scheduler may, e.g. based on the received quality report, adapt the MCS choice, for example according to the declining quality of the channel, e.g. high MCS for the first transmission, lower MCS for the second transmission, and so forth. A second benefit of the proposed solution is that the scheduler of the base station can determine a number of TTIs for which a UE is allowed to use the same precoder. Further on, the scheduler uses the reporting to select the density of reference signals, i.e. an amount of reference signals in a time interval, that are used to select the precoder or to demodulate the data received from the UE. As the decline of the quality of the radio channel may be due to an increase of interference the number of or the choice of jointly scheduled user equipments may be changed according to the reported quality. If the decline is due to bad signal strength, then this can be used to set the signal power or add more reference signals for the base station to figure out the radio channel quality in the uplink. For example, a Sounding Reference Signal SRS may be used to improve the channel estimate.

In one embodiment, the UE may decode a data symbol, such as an Orthogonal Frequency-Division Multiplexing (OFDM) symbol, and uses the decoded symbol(s) as fictitious pilots to (re-)estimate the effective downlink channel gain. The UE may thus determine how much the phase has rotated, and/or the amplitude has changed from one data symbol to the next. Based on the determined phase rotation and/or amplitude change, the UE may determine if its channel gain estimate has degraded more than expected and if so request additional downlink pilots. The UE may for example compare the estimated phase rotation and/or amplitude change to a predetermined threshold.

A predetermined threshold may be determined based on an accepted/acceptable deviation of the statistical invariance of the radio channel. For example, the path gain of one or more data symbols and whether the radio channel is hardened for the one or more data symbols may be determined, and subsequently a threshold corresponding to the acceptable deviation may be set.

In order to determine a condition of the radio channel that exhibits an invariance or a substantial invariance of statistics of the radio channel, i.e. a hardening of the radio channel, the following may be applied: In most cases channel hardening will occur in a MIMO system. This means that the effective SNR of the channel is approximately equal to its average value (over the small scale fading). Channel hardening is essentially a consequence of the law of large numbers and typically occurs if the elements in the channel vector are independent and identically distributed (e.g. independent Rayleigh fading). There are however propagation environments (most notably, keyhole channels) where hardening does not occur.

Dependent on the determined condition of the radio channel the UE may enter a monitoring phase. During the monitoring phase a statistical characterization of the radio channel may be determined. Thus, in one embodiment, the UE may determine the magnitude of the effective channel gain (either, as determined from measurements on downlink pilots or blindly from data). The UE may then compute a variability of this effective channel gain over time and/or frequency and may report this time/frequency variability back to the base station. If the time/frequency variability is small, this implies that the radio channel has a tendency to harden (which then can be exploited by the base station for simplified resource allocation); if the variability is high it means that the channel does not have a tendency to harden (the base station should may then respond to that channel condition and increase the amount of downlink pilots, take this into consideration when performing scheduling, etc.).

The monitoring phase may be understood as a phase or mode during which quality reporting is not performed according to a fixed schedule but during which quality reporting is performed dependent on the statistical characterization of the radio channel. There may thus be another phase or mode in which the UE performs quality reporting according to a fixed schedule, i.e. periodically transmits quality reports of the radio channel.

Also, during such a monitoring phase or mode the transmission of reference symbols in the UL and/or the downlink may be reduced or omitted.

Figure 7:
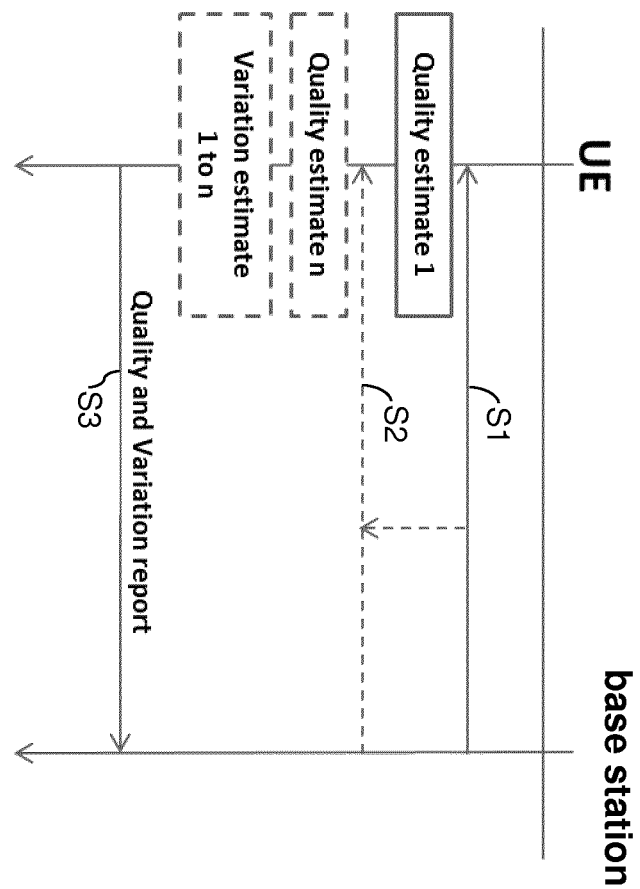
FIG. 7 illustrates a sequence diagram of mechanism generating a quality report.

Now turning to FIG. 7 a mechanism for generating a quality report of a radio channel is illustrated. In a first step S1 a first data symbol is transmitted from the base station and received by the UE. Based on the received data symbol the UE determines a first quality estimate of the radio channel. Subsequently the UE may perform one or more quality estimates in step S2 based on received data symbols.

Based on the one or more quality estimates the UE may then determine a variation of the quality estimate(s) determined in steps S1 and/or S2. This variation may then be compared to a predetermined threshold, e.g. causing a quality report to be sent to the base station in a step S3.

The one or more quality estimates and/or the variation between the one or more quality estimates may then be transmitted by way of a quality report from the UE to the base station. The reception of the quality report may cause the base station to adapt the modulation and/or coding scheme (MCS) employed for transmitting data to the UE. Also, the base station may instruct the UE to adapt its MCS employed for UL transmission.

Figure 8:
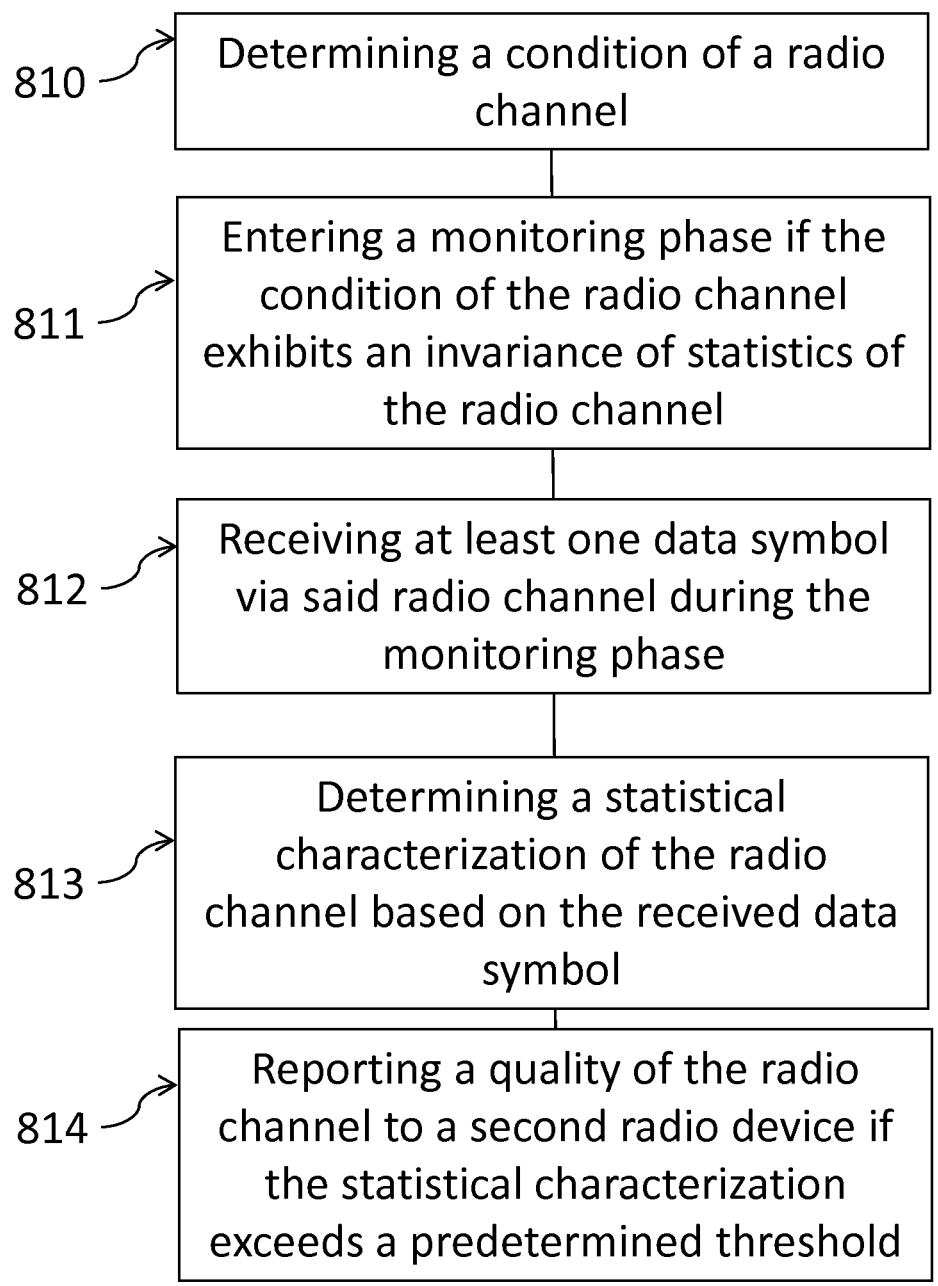
FIG. 8 shows a flowchart of a method according to an embodiment, implemented by a first radio device.

FIG. 8 shows a flowchart illustration of quality reporting of a radio channel performed by a first radio device. The terms first radio device and UE are interchangeably used throughout the description.

At step 810 the first radio device determines a condition of a radio channel between the first radio device and a second radio device. A radio channel may comprise one or more band of frequencies sufficient for radio communication between the first radio device and the second radio device.

The condition of radio channel may be variable and thus affect the radio communication quality between the mobile station and the radio base station. As described in the above different criteria may be taken into account when determining the channel condition. Preferably statistics of the radio channel such as signal gain over time and/or frequency are taken into account for determining the channel condition. For example there may be a channel condition exhibiting an invariance of statistics, which is referred to as channel hardening in the above. Such an invariance of statistics may exhibit a substantial invariance of statistics. That is to say, although the statistics may be variable within a certain predetermined range the radio channel can still be considered being hardened. However, such a condition of the radio channel may also be signaled to the first radio device, e.g. from another radio device.

For example, an invariance of statistics may relate a channel estimate based on first and/or second order statistics of the radio channel, respectively. As understood by those skilled in the art of statistics, first order statistics correspond to the arithmetic mean of the data set, and second order statistics correspond to the variance of the data set with respect to the arithmetic mean. The data set may e.g. comprise one or more received data symbols. Thus, the one or more symbols may be compared to each other and/or to a reference data symbol, e.g. a pilot symbol received or a stored data symbol.

The first channel estimate and the determined accuracy of the first channel estimate are used as first and second order statistics of the radio channel, respectively. A mean square error of the second channel estimate is minimized based on the OFDM sub-carriers to determine the estimate of the radio channel.

At step 811 the first radio device may enter a monitoring phase if the condition of the radio channel exhibits an invariance of statistics of the radio channel. The monitoring phase may serve, as will be described in the following, for determining a statistical characterization of the radio channel based on one or more received data symbol.

Thus, at step 812 the first radio device may receive at least one data symbol via said radio channel during the monitoring phase. The data symbol, as described in the above may be a representation of data using a digital modulation technique such as for example Amplitude shift keying, frequency shift keying and/or phase shift keying.

During the monitoring phase one or more symbols may be received. For example during the monitoring phase only data symbols carrying payload data may be received. Thus, (at least) during the monitoring phase the second radio device may only transmit data symbols carrying payload data. However, the first radio device may also during the monitoring phase receive pilot or reference symbols (not carrying payload data) dedicated for determining a condition of the radio channel, and/or for determining a statistical characterization of the radio channel, and/or for determining a quality of the radio channel.

At step 813 the first radio device may determine a statistical characterization of the radio channel based on the received data symbol. As for example due to noise, e.g. caused by interference, the received data symbols will not match accurately to the constellation points of the modulation scheme as e.g. depicted in FIG. 5 a statistical characterization of the one or more received data symbol may be conducted. Such a statistical characterization may include but is not limited to received signal power a time and/or phase reference as described in connection with FIG. 6.

At step 814 the first radio device may report a quality of the radio channel to a second radio device if the statistical characterization exceeds a predetermined threshold. The statistical characterization as determined in step 813 may consequently be compared to a predetermined threshold. This threshold may be set according to condition of the radio channel, as e.g. determined in step 810. For example the quality of the radio channel may (only) be reported if the statistical characterization of the radio channel exceeds the predetermined range for which the radio channel can be considered being hardened. However, a more sensitive reporting may be achieved by properly setting said predetermined threshold.

It is also possible that a condition of the radio channel is determined and a monitoring phase is entered to check if the condition of the radio channel exhibits an invariance of statistics of the radio channel 810, 811. That is to say, determining the condition of the radio channel may be performed during said monitoring phase. However, the channel condition may be determined before entering the monitoring phase.

The quality of the radio link may include as described with regard to FIG. 7 the quality of one or more data symbols received or a variation of the quality between two or more of said received data symbols as the case may be.

The quality of the radio link may be reported by sending a report such as a CSI or CQI as described in the above with regard to FIG. 6. This report may be transmitted by first radio device. The transmission of the report may be triggered by the statistical characterization exceeding the predetermined threshold. It is to be understood that the report may include the statistical characterization which as the case may be itself includes the deviation of the received data symbols. The statistical characterization may e.g. include the variation/deviation or another quantification amount of variation of the one or more received data symbols.

Further optional steps are described in the following. For example the first radio device may determine the condition of the radio channel and/or the invariance of statistics of the radio channel based on the number of receive antennas of the first radio device.

Further on, the predetermined threshold is determined based on the invariance of statistics of the radio channel, e.g. the dispersion of the statistical invariance of the radio channel. Further on, the step of determining a statistical characterization may comprise determining a signal power of the received data symbol and/or an interference power related to said received data symbol. Further on, the step of determining the signal power comprises: comparing the received signal power to an expected signal power.

The statistical characterization, in particular the expected signal power, may be determined based on a modulation and/or coding scheme (MCS) for transmitting the data symbol. The MCS employed may for example be signaled to the first radio device by the second radio device or the first radio device may determine the MCS employed. Thus, a deviation from the expected MCS may be used in order to determine a statistical characterization of the radio channel.

The step of determining a statistical characterization may comprise: determining at least one variation of the signal power of the data symbol in the frequency domain. The difference of the received signal value to a predetermined value, for example the highest received signal power, the standard deviation of said signal power in the frequency domain, and/or the variance of said signal power in the frequency domain may be determined by the first radio device for this purpose.

The step of determining a statistical characterization may instead or additional comprise determining at least one variation of the signal power of the data symbol in the time domain. For example the signal power level exceeds an initial power, the signal power is below/above an expected power, for example an expected power based on an MCS, an increase and/or decrease of the frequency domain variations of received signal power, and/or a correlation between received signal power of received data symbols may be determined by the first radio device for this purpose.

The step of reporting the quality of the radio channel, in particular the statistical characterization, may comprise reporting the interference power and/or the signal power of the data symbol received, and/or reporting variations of the interference power and/or the signal power of the data symbol received. Thus, quality of the radio channel as determined by the first radio device may be based on the statistical characterization of the radio channel as e.g. determined in step 813. However, the quality of the radio channel as determined by the first radio device may be based on additional or alternative measurements of the radio channel and/or an interference hypothesis, e.g. in the form of a CSI process.

The condition of the radio channel may be determined based on a plurality of sequentially received data symbols. For example for a reliable determination of the condition of the radio channel not only one but a plurality of data symbols may be used by the first radio device. The channel condition may be determined based on one or more data symbols containing a pilot or reference symbol. The channel condition may also be determined based on one or more data symbols containing a payload data.

The statistical characterization of the radio channel may be based on a plurality of sequentially received data symbols, e.g. downlink data symbols. These data symbols may be received during the monitoring phase.

The condition of the radio channel and/or the statistical characterization of the radio channel may be performed solely based one or more data symbols received containing payload data. For example (at least) during the monitoring phase no data symbols dedicated for channel estimation are received by the first radio device (because no such reference symbols are transmitted by the second radio device (at least) during the monitoring phase).

The condition of the radio channel and/or the statistical characterization is based on at least one received pilot symbol. For example during the monitoring phase the reception of data symbols may be reduced (and thus overhead may be reduced) because the second radio device does not transmit such data symbols being dedicated to channel estimation.

Figure 9:
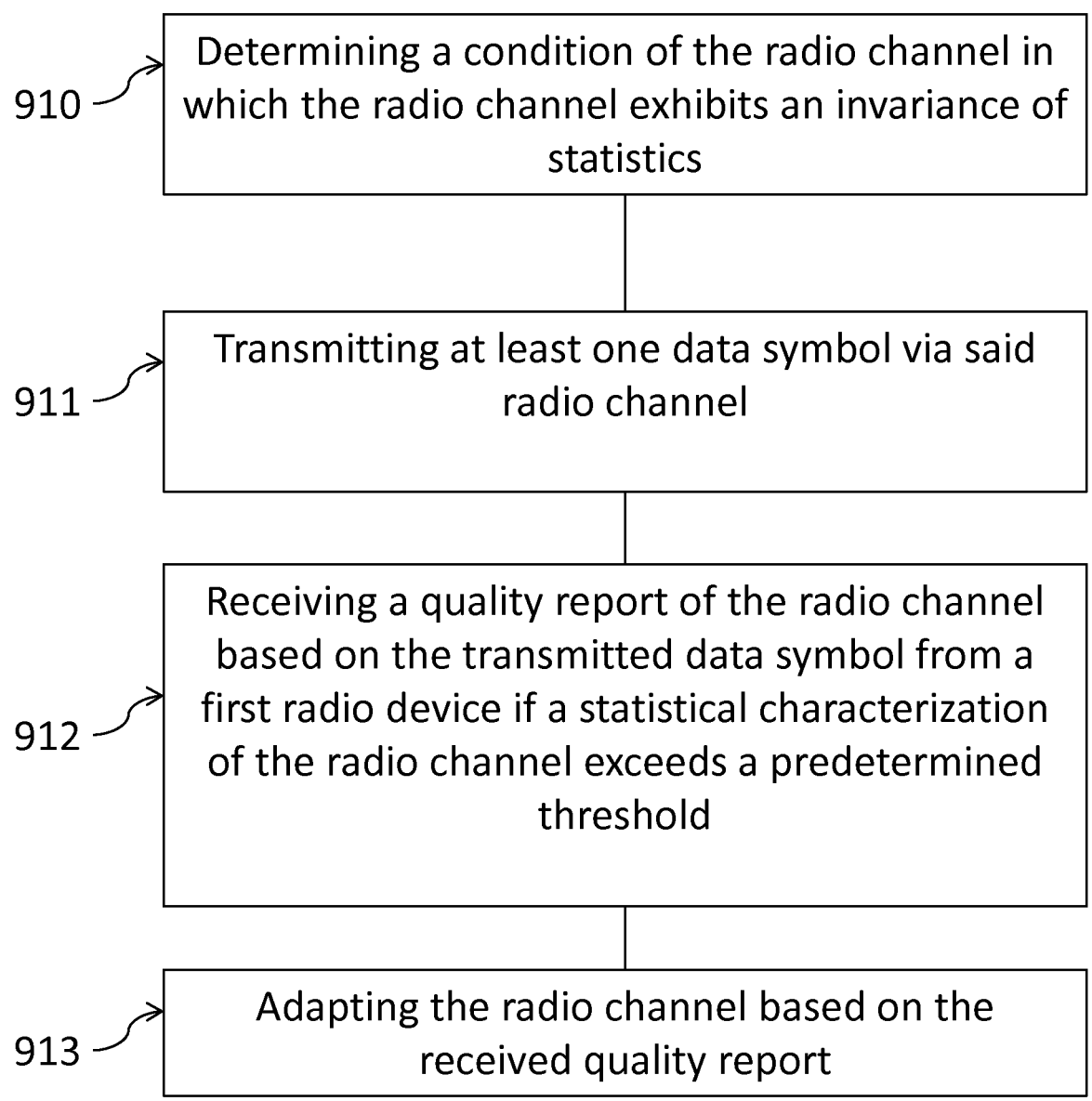
FIG. 9 shows a flowchart of a method according to an embodiment, implemented by a second radio device.

FIG. 9 shows a flowchart illustration of quality reporting of a radio channel performed by a second radio device. The terms base station and second radio device are interchangeably used throughout the description.

At step 910 the second radio device may determine a condition of the radio channel in which the radio channel exhibits an invariance of statistics. As pointed out with respect to FIG. 8 the condition may also be signaled to the second radio device as the case may be.

At step 911 the second radio device may transmit at least one data symbol via said radio channel. Thus the transmission of the at least one data symbol may occur when the first radio device is in a monitoring phase.

At step 912 the second radio device may receive a quality report of the radio channel. The quality report may be based on the data symbols transmitted by the second radio device. The report may be transmitted by a first radio device. The quality report may be triggered if a statistical characterization of the radio channel exceeds a predetermined threshold.

As a consequence the second radio device may at step 913 adapt the radio channel based on the received quality report. Further optional steps are described in the following.

For example, the second radio device may determine a condition of the radio channel based on a number of transmit antennas of the second radio device, as an invariance of statistics of a radio channel is more probable with a large number of antennas, cf. FIGS. 1, 2 and 3 and the corresponding description.

The second radio device may adapt the transmission over the radio channel based on the received quality report, wherein adapting the transmission may comprise increasing a number of uplink reference signals transmitted by the first radio device, e.g. by instructing the first radio device to transmit at least one pilot symbol. Adapting transmission over the radio channel may further comprise selecting another MSC for transmission in the downlink, from the second radio device to the first radio device, or selecting another MSC for transmission on the uplink, from the first radio device to the second radio device. The first radio device may for the purpose of transmission in the uplink receive a signaling indicating to the first radio device which MSC to employ for uplink transmission.

Even though, especially in a time division duplex (TDD) transmission mode between the first and the second radio device, reciprocity may exist between the uplink and the downlink transmission the radio channel as estimated for the uplink (e.g. by way of a quality report such as CSI) turn out to be different and make it thus necessary to determine the radio channel condition and/or a statistical characterization of the radio channel independently for the uplink and the downlink.

Thus, as in the case of frequency division duplex (FDD) feedback (return) channel may be used between the transmitter device and the receiver device so as to enable the transmitter device to have knowledge about the transmit channel as estimated and then fed back by the receiver device.

Figure 10:
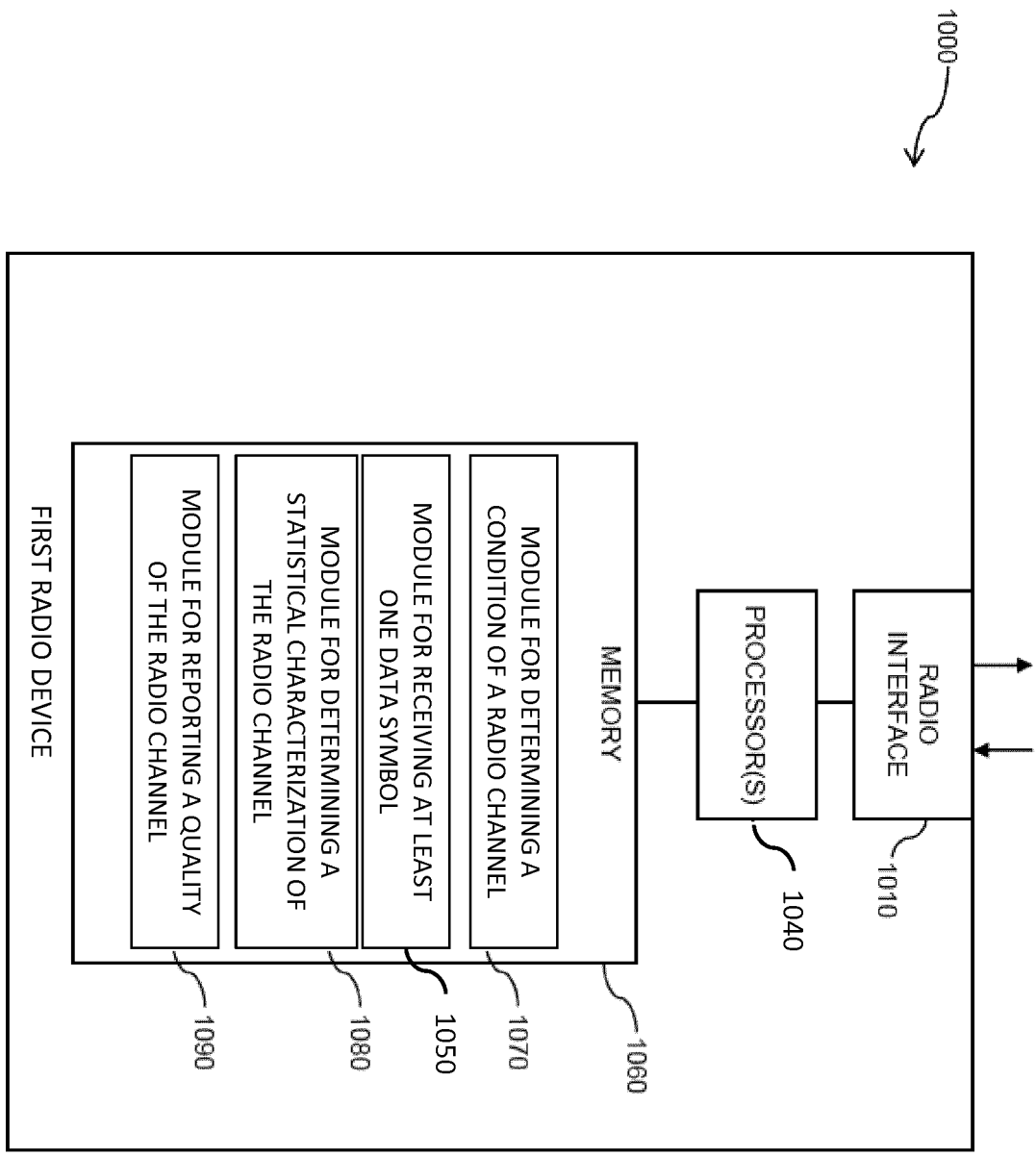
FIG. 10 illustrates a first radio device, such as a UE.

FIG. 10 illustrates exemplary structures which may be used for implementing the above concepts in a first radio device 1000.

Further, the first radio device 1000 may include one or more processors 1040 coupled to the radio interface 1010, and a memory 1060 coupled to the processor(s) 1040. The memory 1060 may include a ROM, e.g., a flash ROM, a RAM, e.g., a DRAM or SRAM, a mass storage, e.g., a hard disk or solid state disk, or the like. The memory 1060 includes suitably configured program code to be executed by the processor(s) 1040 so as to implement the above-described functionalities of a first radio node. In particular, the memory 1060 may include various program code modules for causing the first radio device 1000 to perform processes as described above, e.g., corresponding to the method steps of FIG. 8.

As illustrated, the memory 1060 may include module for determining a condition of a radio channel 1070 for implementing the above-described functionalities of determining a condition of the radio channel and entering a monitoring phase if the condition of the radio channel exhibits an invariance of statistics of the radio channel. Further, the memory 1060 may include a module for receiving at least one data symbol 1050 for implementing the above-described functionalities of receiving at least one data symbol via said radio channel during the monitoring phase.

Further, the memory 1060 may include a module for determining a statistical characterization of the radio channel 1080 for implementing the above-described functionalities of determining a statistical characterization of the radio channel based on the received data symbol.

Further, the memory 1060 may include a module for reporting a quality of the radio channel 1090 for implementing the above-described functionalities of reporting a quality of the radio channel to a second radio device if the statistical characterization exceeds a predetermined threshold.

It is to be understood that the structures as illustrated in FIG. 10 are merely schematic and that the first radio device 1000 may actually include further components which, for the sake of clarity, have not been illustrated, e.g., further interfaces or processors. Also, it is to be understood that the memory 1060 may include further types of program code modules, which have not been illustrated, e.g., program code modules for implementing known functionalities of a radio device. According to some embodiments, also a computer program may be provided for implementing functionalities of the first radio device 1000, e.g., in the form of a physical medium storing the program code and/or other data to be stored in the memory 1060 or by making the program code available for download or by streaming.

Figure 11:
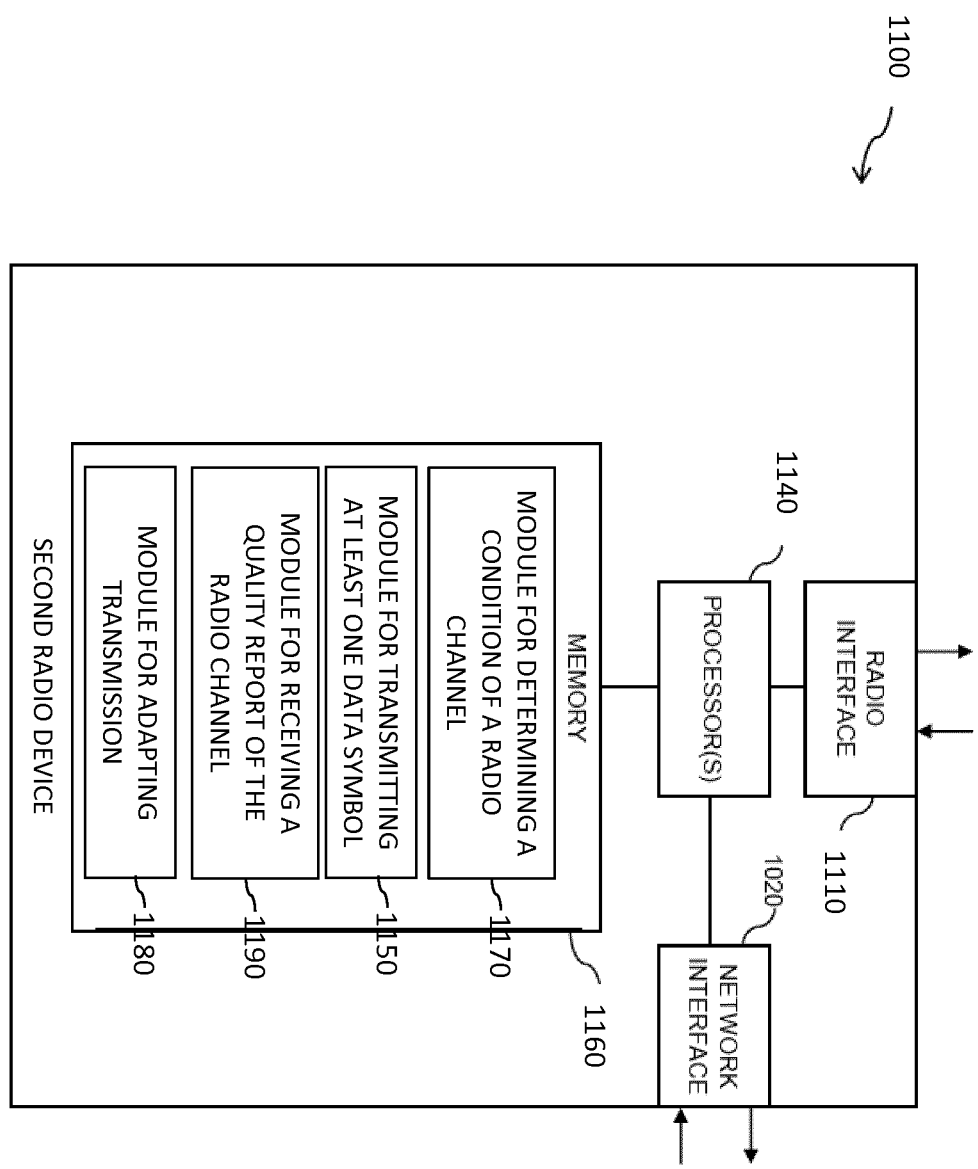
FIG. 11 illustrates a second radio device, such as a base station.

FIG. 11 illustrates exemplary structures which may be used for implementing the above concepts in a second radio device 1100. The second radio device 1100 may for example correspond to a base station, such as an eNB of the LTE technology.

As illustrated, the second radio device 1100 may include a radio interface 1110 for establishing connections of radio devices, such as the first radio device 1000, to the second radio device 1100. If the second radio device 1100 corresponds to an eNB of the LTE technology, the radio interface 1110 may for example implement the Uu radio interface of the LTE technology. Further, the second radio device 1100 may include a network interface 1020 for connecting to other radio devices, e.g. another base station. If the second radio device 1100 corresponds to an eNB of the LTE technology, the network interface 1020 may for example implement the X2 interface of the LTE technology.

Further, the second radio device 1100 may include one or more processors 1140 coupled to the interfaces 1110, 1020, and a memory 1160 coupled to the processor(s) 1140. The memory 1160 may include a Read Only Memory (ROM), e.g., a flash ROM, a Random Access Memory (RAM), e.g., a Dynamic RAM (DRAM) or Static RAM (SRAM), a mass storage, e.g., a hard disk or solid state disk, or the like. The memory 1160 includes suitably configured program code to be executed by the processor(s) 1140 so as to implement the above-described functionalities of an access node. In particular, the memory 1160 may include various program code modules for causing the second radio device 1100 to perform processes as described above.

As illustrated, the memory 1160 may include a module for determining a condition of a radio channel 1170 for implementing the above-described functionalities of determining a condition of the radio channel in which the radio channel exhibits an invariance of statistics.

Further, the memory 1160 may include a module for transmitting at least one data symbol 1150 for implementing the above-described functionalities of transmitting at least one data symbol via said radio channel.

Further, the memory 1160 may also include a module for receiving a quality report of the radio channel 1190 for implementing the above-described functionalities of receiving a quality report of the radio channel based on the transmitted data symbol from a first radio device if a statistical characterization of the radio channel exceeds a predetermined threshold.

Further, the memory 1160 may also include a module for module for adapting transmission 1180 for implementing the above-described functionalities of adapting transmission over the radio channel based on the received quality report.

It is to be understood that the structures as illustrated in FIG. 11 are merely schematic and that the second radio device 1100 may actually include further components which, for the sake of clarity, have not been illustrated, e.g., further interfaces or processors. Also, it is to be understood that the memory 1160 may include further types of program code modules, which have not been illustrated, e.g., program code modules for implementing known functionalities of a base station. According to some embodiments, also a computer program may be provided for implementing functionalities of the second radio device 1100, e.g., in the form of a physical medium storing the program code and/or other data to be stored in the memory 1160 or by making the program code available for download or by streaming.

It is to be understood that the examples and embodiments as explained above are merely illustrative and susceptible to various modifications. For example, the illustrated concepts may be applied in connection with various cellular radio technologies. Moreover, it is to be understood that the above concepts may be implemented by using correspondingly designed software to be executed by one or more processors of an existing device, or by using dedicated device hardware. Further, it should be noted that the illustrated nodes may each be implemented as a single device or as a system of multiple interacting devices.

The invention claimed is:

1. A method, implemented in a first radio device, for quality reporting of a radio channel, the method comprising:
    determining a condition of the radio channel and entering a monitoring phase if the condition of the radio channel exhibits an invariance of statistics of the radio channel;
    receiving at least one data symbol via the radio channel during the monitoring phase;
    determining a statistical characterization of the radio channel based on the received at least one data symbol during the monitoring phase; and
    reporting a quality of the radio channel to a second radio device if the statistical characterization exceeds a predetermined threshold.

2. The method of claim 1:
    wherein the determining the condition of the radio channel is based on a number of receive antennas of the first radio device; and/or
    wherein the invariance of statistics of the radio channel is based on the number of receive antennas of the first radio device.

3. The method of claim 1, wherein the predetermined threshold is determined based on the invariance of statistics of the radio channel.

4. The method of claim 1, wherein the determining the statistical characterization comprises determining a signal power of the received at least one data symbol and/or an interference power related to the received at least one data symbol.

5. The method of claim 4, wherein the determining the signal power comprises comparing the signal power to an expected signal power.

6. The method of claim 1, wherein the determining the statistical characterization of the radio channel comprises determining an expected signal power based on a modulation and/or coding scheme for transmitting the at least one data symbol.

7. The method of claim 1, wherein the determining the statistical characterization comprises determining at least one variation of signal power of the received at least one data symbol in a frequency domain.

8. The method of claim 1, wherein the determining the statistical characterization comprises determining at least one variation of signal power of the received at least one data symbol in a time domain.

9. The method of claim 1, wherein the reporting the quality of the radio channel comprises:
    reporting interference power and/or signal power of the received at least one data symbol; and/or
    reporting variations of the interference power and/or the signal power of the received at least one data symbol.

10. The method of claim 1, wherein the condition of the radio channel is determined based on a plurality of sequentially received data symbols.

11. The method of claim 1, wherein the statistical characterization of the radio channel is based on a plurality of sequentially received data symbols.

12. The method of claim 1, wherein the condition of the radio channel and/or the statistical characterization of the radio channel is determined solely based on received one or more data symbols containing payload data.

13. The method of claim 1, wherein the condition of the radio channel and/or the statistical characterization is based on at least one received pilot symbol.

14. A first radio device for quality reporting of a radio channel, the first radio device comprising:
    processing circuitry;
    memory containing instructions executable by the processing circuitry whereby the first radio device is operative to:
        determine a condition of the radio channel and enter a monitoring phase if the condition of the radio channel exhibits an invariance of statistics of the radio channel;
        receive at least one data symbol via the radio channel during the monitoring phase;
        determine a statistical characterization of the radio channel based on the received at least one data symbol during the monitoring phase; and
        report a quality of the radio channel to a second radio device if the statistical characterization exceeds a predetermined threshold.

* * * * *